US009272366B2

(12) United States Patent
Reversat et al.

(10) Patent No.: US 9,272,366 B2
(45) Date of Patent: Mar. 1, 2016

(54) SYSTEM FOR MARKING A CABLE WITH A CURVED MARKING AREA

(71) Applicant: LASELEC, Toulouse (FR)

(72) Inventors: Fabien Reversat, Colomiers (FR); Stephane Rougier, Pompertuzat (FR); Pierre Bouvet, Toulouse (FR)

(73) Assignee: LASELEC, Toulouse (FR)

( * ) Notice: Subject to any disclaimer, the term of this patent is extended or adjusted under 35 U.S.C. 154(b) by 0 days.

(21) Appl. No.: 14/769,009

(22) PCT Filed: Feb. 20, 2014

(86) PCT No.: PCT/FR2014/050347
§ 371 (c)(1),
(2) Date: Aug. 19, 2015

(87) PCT Pub. No.: WO2014/128406
PCT Pub. Date: Aug. 28, 2014

(65) Prior Publication Data
US 2016/0001399 A1    Jan. 7, 2016

(30) Foreign Application Priority Data

Feb. 20, 2013   (FR) .................................. 13 51466

(51) Int. Cl.
*B23K 26/08*    (2014.01)

(52) U.S. Cl.
CPC .................................... *B23K 26/083* (2013.01)

(58) Field of Classification Search
CPC ........ B23K 26/083; B23K 26/08; B44B 7/00; B41F 17/10
See application file for complete search history.

(56) References Cited

U.S. PATENT DOCUMENTS 5,474,627 A    12/1995 Carriere et al.
5,827,391 A * 10/1998 Carriere ............... H01B 13/348
                                                  156/272.8

FOREIGN PATENT DOCUMENTS

DE    31 47 230 A1    6/1983
EP    0 415 674 A2    3/1991
GB    2 301 315 A    12/1996

OTHER PUBLICATIONS

International Search Report, dated Jul. 7, 2014, for corresponding PCT Application.

* cited by examiner

*Primary Examiner* — Sarah Al Hashimi
(74) *Attorney, Agent, or Firm* — Young & Thompson

(57) ABSTRACT

The invention relates to a cable marking system comprising: -at least one marking area for marking a portion of cable by means of at least one laser device; -at least one laser device; -at least one cable-driving device designed to pass said cable through said at least one marking area.

19 Claims, 4 Drawing Sheets

SYSTEM FOR MARKING A CABLE WITH A CURVED MARKING AREA

Figure 1:
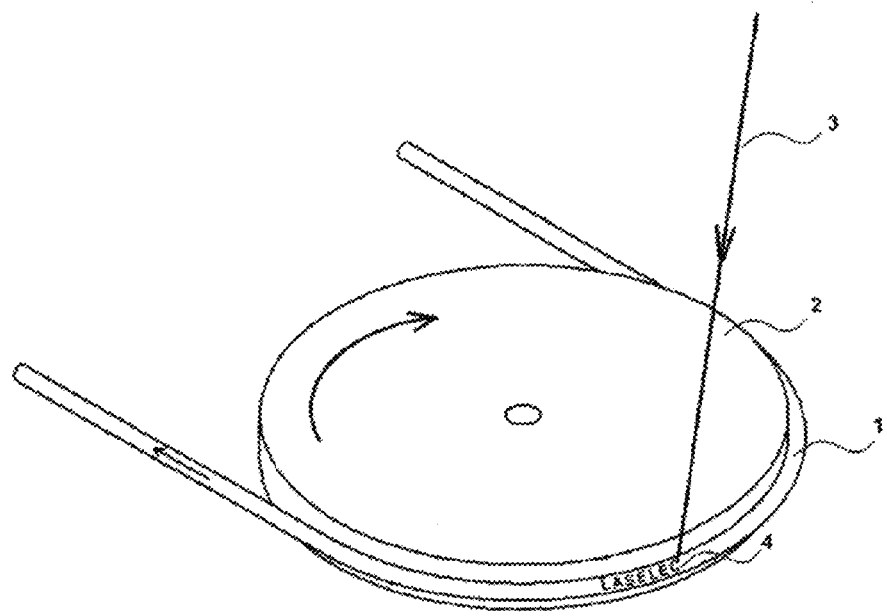

The present invention relates to marking cables by means of a laser beam.

This type of marking makes it possible to rapidly and effectively create reference marks (alphanumerical, barcode or other patterns) in a permanent and unalterable manner on the sheaths of cables, such as electrical cables or other cables.

The marking can consist, for example, of an ablation of material. It can also consist of a discoloration of the sheath of the cable.

In the case of discoloration, ultraviolet lasers (UV) can be used to strike cable sheaths doped with titanium dioxide pigment. This is the case particularly in aeronautical applications.

Regardless of the type of method used (ablation, discoloration or other), several marking techniques can be used.

A first technique can consist of using a relatively high energy laser at a relatively low firing rate (on the order of several hertz to several tens of hertz). The laser beam can be shaped by means of an amplitude mask used as a "stencil" whose image is projected on the surface of the cable using optical means. With this first technique, each laser shot (which generally lasts several nanoseconds) allows the generation of a whole character (for example, an alphanumerical character).

A second technique can consist of using a relatively low energy laser at a high firing rate (on the order of several kilohertz to several hundreds of kilohertz). The laser beam can be focused and swept over the surface of the cable with a deflection system. With this second technique, each character (for example, an alphanumerical character) is pixelated and generated by means of a larger number of laser shots.

Regardless of the technique used, the cable marking generally needs to be carried out on the fly to be productive. A second optical deflection element is provided in order to allow the laser beam to follow the cable during the marking of a reference mark (consisting of one or more patterns or characters) and then reposition itself rapidly at the start of the marking area for marking the next reference mark. This makes it possible to pass the cable through at very high speed and to mark it at an artificially slowed speed.

For this marking of the cable on the fly, it is possible to use a rectilinear marking area, in which the cable that passes through is guided in the best possible manner. The operation of deflection of the laser beam above the marking area can be carried out by means of a galvanometric mirror in combination with a flat field lens, making it possible to form a clear image in the plane of the upper surface of the cable over the entire length of the marking area.

In the case of the second technique mentioned above, a head for sweeping in an XY plane, which consists of two galvanometric mirrors, makes it possible to carry out both the sweeping of the beam for writing each pattern or character, and the following of the cable depending on the direction in which it is passed through. The flat field lens makes it possible to focus the laser in the plane of the surface of the cable.

In general, the above-mentioned second marking technique (using the sweeping of a high-frequency laser beam) has found widespread use in numerous industrial applications. It benefits from the following advantages in comparison to the first technique (using a high-energy, low-frequency laser and an amplitude mask):

versatility of the marked patterns: their size and their shape can be selected freely as opposed to being imposed by a mask.

better optical yield: since the beam is not obstructed by an amplitude mask, all the energy can be used for the marking process. For example, if one considers the marking of the letter "1" or of a bar of a barcode, the transmission yield through the mask of the first technique can be less than 10%, while there is no loss of energy if one uses the second technique, compatibility with high-rate laser sources, pumped by continuous laser diodes, characterized by very high reliability and reduced maintenance, longer useful life of the optical components for conveying and shaping the beam (in particular for UV marking): at equivalent average power, the aging of the optics is less critical in the case of low energies and high rates than in the case of high energies and low rates.

However, the application of the second technique to the marking of electrical cables is particularly problematic, in particular with regard to the quality of the patterns obtained by on-the-fly marking of the cable. It is in fact extremely difficult to prevent vibrations of the cable as it is passed through the rectilinear marking area, in particular movements transverse to the direction in which it is passed through and movements of rotation about this axis. These movements, even if they are minute, cause a deformation of the marked characters, since the marking of a character is not instantaneous as is the case in the first technique mentioned.

This problem is even greater on cables having a section that is not perfectly circular, such as wrapped single-strand cables, and it is even more serious on twisted multi-wire cables.

For example, if one considers a laser source with a rate of 10 kHz, the time interval between each firing is on the order of 100 microseconds. If it takes 200 firings to write a character having a size on the order of one millimeter, the operation lasts 20 milliseconds.

The twisting pitch of a shielded twisted multi-wire cable is generally between 5 millimeters and 50 millimeters. If the cable is passed through at a speed of 1 meter per second, the time period of the vibrations to which the cable is exposed owing to its geometric characteristics will be on the order of 5 to 50 milliseconds.

This example based on figures connected with the performances of the systems for laser marking of aeronautical cables shows that the time scales corresponding to the marking of a character and the period of the vibrations are of the same order of magnitude.

Thus, there is a considerable risk of distortion of the characters as soon as the amplitude of the vibrations is not negligible compared to the size of the marked characters.

In practice, the size of the marked characters is generally on the order of one to a few millimeters.

The amplitude of the vibrations depends on the cables and on the manner in which they are guided in the marking area, but it sometimes reaches several tenths of a millimeter in a rectilinear marking area, which results in considerable deformation of the characters and affects the readability of the reference marks or barcodes.

The problem of deformation of the characters considerably limits the industrial use of the second technique, although it has numerous advantages compared to the other techniques.

The vibration of the cable in the marking area is also problematic in the afore-mentioned first technique. Indeed, the vibration of the cable affects the alignment of the different characters with respect to one another, since the time scale between two LASER shots is from several milliseconds to tens of milliseconds.

Thus, there is a need to improve the techniques of marking a cable by laser, notably in regard to the above-mentioned problems.

The present invention falls within this context.

A first aspect of the invention concerns a cable marking system comprising:
- at least one marking area for marking a portion of cable be means of at least one laser device,
- at least one cable driving device configured to cause said cable to pass through in at least one marking area, and
- a cable curving device configured to curve said cable in said at least one marking area.

The curving of the cable makes it possible to control the passage of the cable so as to minimize the vibrations of said cable and prevent the marking deformations caused by such vibrations.

The curvature imposed on the cable in the marking zone can be circular, elliptic, parabolic or other.

It may be possible to impart mechanical tension on the cable by means of a cable tensioning device.

The system can moreover comprise at least one cable holding device configured to hold said cable at the site of said at least one cable tensioning device.

The device can also make it possible to apply the cable against the cable curving device.

The control of the passage of the cable is thus reinforced.

The system can moreover comprise at least one cable guiding device configured to guide said cable, at least in said marking area.

Such a guiding device makes it possible, for example, to arrange the marking area close to areas where said cable is exposed to mechanical stresses, such as a cutting area, for example. The compactness of the system is improved as a result.

The driving device can comprise an adhering coating in contact with said cable.

Thus, the driving of the cable is improved.

For example, the outer surface of a wheel, against which the cable is applied, can comprise an adhering coating making it possible to prevent the sliding of the cable. This is particularly useful in the case where the curving and driving devices are combined.

For example, the driving device can comprise at least one drive belt configured to drive said cable.

In another example, the driving device comprises at least one pair of drive belts facing one another and configured to accommodate said cable between them. The cable is thus held sandwiched between the belts.

The cable driving device and the cable tensioning device can be integrated in the same device.

Thus, the system is more compact.

This is the case, for example, with a wheel that drives the cable while giving it a curvature.

The system is reduced in size as a result.

According to some embodiment examples, the curving device comprises at least one wheel portion.

Thus, a complete wheel or only a portion thereof can be used.

The use of a wheel portion makes it possible to use a larger radius of curvature while keeping the reduced dimensions of the system.

For example, the wheel portion is configured to allow said cable to slide in said marking zone.

In another example, the wheel portion comprises a plurality of rolling bearings for causing said cable to roll in said marking area.

For example, the cable holding device can comprise a plurality of rolling bearings. These rolling bearings can be regularly spaced and/or organized along the curvature of the curving device. For example, when a wheel is used as curving device, the rolling bearings can be organized along an arc of a circle so as to completely hold the cable to be driven.

According to some embodiments, the wheel portion is configured to allow a drive belt of the cable to slide in said marking zone.

For example, the wheel portion comprises a plurality of rolling bearings for causing said at least one belt to roll in said marking area.

The wheel portion can be stationary. One can then provide drive means combined with said wheel portion in order to drive the cable.

The driving device can also comprise a device configured so as to perform a rotational movement.

The cable can then be set in motion while stretching the cable.

For example, the wheel rotates freely or is driven by a motor. The path imposed on the cable is thus circular.

The wheel can also support a belt, which may or may not be driven, against which the cable rests and which imposes its curvature on said cable.

According to some embodiments, the laser device is configured to emit at least one laser beam in a direction perpendicular to the plane of said at least one wheel portion.

The system can then be more compact.

For example, the laser device is configured to emit at least one laser beam that moves as a function of the passage of said cable.

For example, the laser device is configured to shift the beam in a plane parallel to a plane of passage of the cable in the marking area.

The sweeping of the laser beam can be carried out rapidly and it can produce the marking in a plane parallel to the plane of passage of the cable in the marking area.

In the marking plane, encompassing the surface of the cable, the path of the laser beam can follow the curved path of the cable imposed by the curving device.

According to some embodiment examples, the marking device consists of a laser, of optical elements for shaping the laser beam, of a pair of galvanometric mirrors making it possible to sweep the beam in two axes of a plane, and of a flat field lens making it possible to focus the beam in one plane, the marking plane.

The system can comprise, in addition, a cable tensioning device, configured so as to impart a mechanical tension on said cable in said cable marking area.

For example, the cable tensioning device and the driving device can be integrated in the same device.

For example, a set of pulleys can be used both for driving the cable and for imparting a mechanical tension on it.

The system can moreover comprise the laser marking device.

A second aspect of the invention relates to a cable marking method comprising the following steps:
- driving said cable in order to cause it to pass through in a marking area,
- curving said cable in said marking area, and
- marking at least a portion of said cable in said marking area.

The method can moreover comprise the steps of using means of the system according to the first aspect.

The method can moreover comprise one or more of the following steps:

unwinding of said cable wound on a spool, and keeping the tension of the latter during its passage, guiding said cable in said marking area by said device for curving the cable, and marking at least a portion of said cable in said marking area.

The method according to the second aspect of the invention procures at least the same advantages as those procured by the system according to the first aspect.

According to some embodiments of the system or of the method according to the first and second aspects, said laser beam is normal to said marking plane.

Another aspect of the invention, which is not exclusive of the preceding aspects, concerns a system for cable marking by laser beam comprising:

a curving device configured to curve the cable in a plane normal to the main direction of the laser beam, and at least one laser device with sweeping of the beam, configured so as to produce marks on the fly by following the cable along at least a portion of its curved path imposed by said curving device.

The following can take place over several centimeters, for example.

For example, the curving device is a rotating wheel.

The system comprises, for example, a belt that is part of the curving device and that can be configured to drive the cable.

For example, the curving device is associated with a device for driving the cable, comprising at least one pair of drive belts facing one another and configured to accommodate said cable between them.

For example, the curving device comprises at least a wheel portion configured to allow said cable to slide.

For example, the wheel portion comprises a plurality of rolling bearings in order to cause said cable to roll.

For example, the curving device also contributes to driving said cable.

The system comprises, for example:

a motor-driven wheel with an adhering coating for adhering to said cable, an application device configured to tightly hold said cable against said motor-driven wheel thus allowing the driving of said cable.

For example, the cable is at the same time driven by said wheel, curved by said wheel and marked on a portion of its curved path in the marking area.

For example, the application device comprises a plurality of rolling bearings.

Another aspect of the invention, which is not exclusive of the preceding aspects, concerns a method for laser marking a cable on the fly, comprising the following steps:

curving of the cable at the site of the marking area in a plane normal to the main direction of the laser beam, marking the cable by sweeping the laser beam while following the cable (with the laser beam) along at least a portion of the curved path imposed on said cable by said curving device.

Figures 2A, 2B:
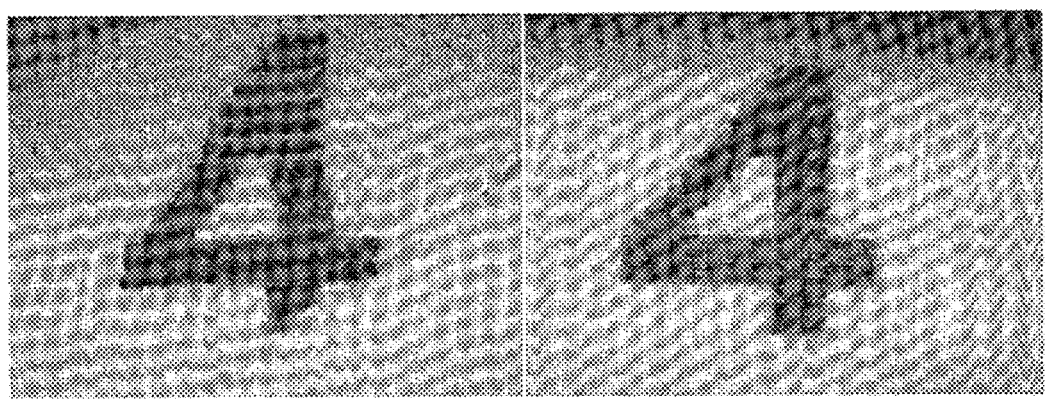

Other characteristics and advantages of the invention will become apparent when reading the present detailed description below, as a nonlimiting example, and the appended drawings among which:

FIG. 1 diagrammatically illustrates a general embodiment;

FIGS. 2*a* and 2*b* illustrate deformed and undeformed markings;

FIGS. 3-7 illustrate more particular embodiments.

In the description below, embodiments are described in the context of the marking by sweeping of the beam. These embodiments make it possible to prevent the deformation of the characters marked on the fly during the passage of the cable in the marking area.

If applicable, each element presented in each embodiment can be used in another embodiment.

The fields of application of these embodiments are, in particular:

marking by discoloration of the sheath of aeronautical electrical cables using a pulsed UV LASER source in a nanosecond regimen, marking of the black, white or colored sheath of electrical cables or optical fibers, by means of a pulsed LASER source of UV, visible or else infrared wavelength, marking of the black, white or colored sheath of electrical cables or optical fibers, by means of a continuous LASER source, of UV, visible or else infrared length, LASER marking of the surface of all types of wires, cords, sheaths, flexible tubes or pipes which are not conductors of electricity.

The markings that can be produced by means of these embodiments are, in particular:

marking by discoloration of the material, marking by ablation and modification of the reflectance properties of the treated material, marking of alphanumeric characters in outline only, or filled-in with or without an outline, marking of barcodes, marking of 2D barcodes (data matrix), marking of logos or initials, marking of graduations, markings with one or more laser beams focused on the surface of the wire, marking with a laser beam whose spatial contribution has been optimized ("top hat").

A general embodiment is presented in reference to FIG. 1. A cable 1 is stretched and passes over a wheel 2 rotating about its axis of rotation. The wheel is used as a pulley. The laser beam 3 originating from a laser device (not represented) strikes the cable in order to produce a marking 4 (LASELEC).

The marking of the cable is carried out by following (or sweeping) the cable with the laser beam along the curved path imparted on the cable in a marking area. Here, the cable follows an arc of a circle (formed by a portion of the arc of the wheel on which the cable is stretched), constituting the marking area. The marking is carried out in a plane parallel to the plane of the wheel and containing the surface of the cable. The laser beam originates from a deflection system controlled by the system, and its direction is close to the normal to the plane of the wheel. The laser beam is swept in order to mark each character of the reference mark.

The cable being curved over the wheel, it cannot vibrate and it progresses in a controlled manner over the arc of a circle constituting the marking area. This is the case for most cable types, in particular wrapped cables and twisted multi-wire cables, since their wavy shape matches the circular contour of the wheel, and also since they turn with said wheel.

The wheel used preferably has the best possible roundness, in particular for cables of very small diameters.

The cable can also be driven by one or more driving devices (not represented). Alternatively, or in combination, the wheel can be motor driven.

Alternatively, or in combination, a cable tensioning device (not represented) can be provided to impart mechanical tension on the cable. Thus, the holding of said cable can be ensured or improved.

For example, one or more cable unwinding devices can be used to gradually release the cable. The cable is then released as it is driven by said driving device. For example, the cable can be wound on a spool initially and unwound gradually. During the gradual release of the cable, said cable is held under mechanical tension.

A holding device (not represented) can be provided for holding the cable at the location of the wheel. Thus, the cable can be applied against the wheel.

Thus, according to some embodiments, the cable is driven by a driving device and kept taut (for example, by the unwinding device itself). The cable is applied, for example, against the outer flank of the curving device in the marking area. The marking area can encompass the entire area of curvature of the cable or only a portion.

By being exposed to a bearing force transverse to its direction of passage, the cable follows a controlled path and thus avoids vibrations that risk causing a deformation of the marking.

FIG. 2a represents a result of conventional marking on the fly obtained on a wrapped single-wire cable guided in a rectilinear marking area. Because of the vibrational movements of the cable, said cable in effect deviated from its ideal transverse position during the marking of the character on the fly. The result is a deformation of the marked character ("4").

FIG. 2b represents a result of a marking on the fly according to some embodiments, which was obtained on the same type of cable. The marked character ("4") has not undergone any deformation, since the cable did not deviate from its ideal transverse position during the marking.

Figure 3:
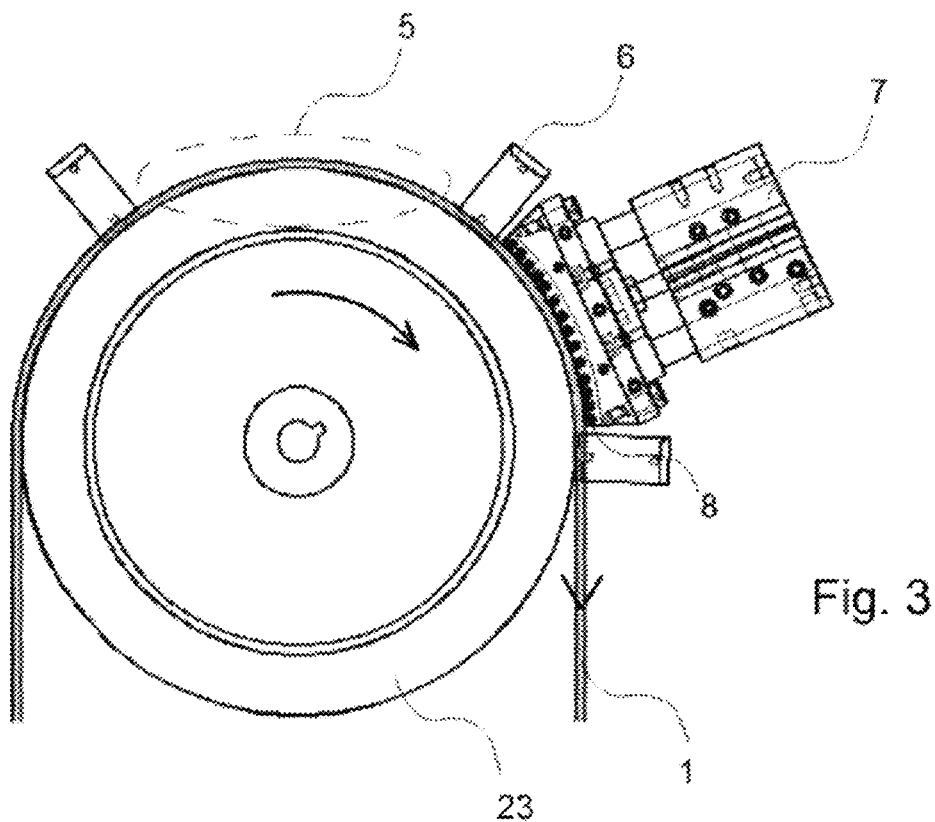

In the embodiment illustrated in FIG. 3 (which again shows the elements of FIG. 1 with the same reference numerals), the wheel 23 is used both for guiding and driving the cable 1.

The wheel is motor driven (motor not represented). In order to improve the driving of the cable, the wheel can be covered by a coating (made of polyurethane, for example) having good properties of adherence and of resistance to wear. In addition, a system for applying the cable 7 can be associated with the wheel so as to combine in the same device the two functions of curving the cable and of driving said cable.

The laser beam (not represented) is deflected by a head for sweeping in an XY plane. The sweeping head comprises, for example, two galvanometric mirrors. For example, the laser beam is focused by means of a flat-field optical lens whose focal plane is parallel to the plane of the wheel and coincides with the surface of the cable.

The marking on the fly is carried out in rotation mode in the marking area 5 located between one, two or more devices 6 for guiding the cable.

The system for applying the cable comprises, for example, a jack associated with a device adapted to the outer diameter of the wheel. The application system can moreover comprise rolling bearings 8. This system makes it possible to press the cable against the lateral surface of the wheel, while allowing its passage, so that the motor-driven wheel can drive the cable without sliding.

The separation between the different castors 8 can be irregular and it can be optimized so as to allow an optimal contact on the outer casing of the twisted multi-wire cables, regardless of the pitch of the twists and regardless of their position.

This embodiment has the advantage, besides the possibility of preventing the deformation of the characters (regardless of the type of cable), of having a marking area very close to the cutting area of the cable (not represented) located downstream of the drive area (at the location of the application device). Indeed, it is desirable to reduce this distance on the machines for marking and cutting cables, so as to minimize the lost cable lengths (the beginning of the installed cable cannot be marked and it constitutes scrap).

This embodiment moreover makes it possible to prevent any deformation of characters that is associated with longitudinal vibrations of the cable (micro "knocks" in the direction of passage), which are generated sometimes by the cable driving system with toothed pulleys and belts, which are used mostly in current cable marking machines.

In the embodiment illustrated in FIG. 4, which again shows the elements of FIG. 1 with the same reference numerals, the laser marking of the cable 1 is carried out on a non motor-driven wheel 24 which can turn freely.

The driving of the cable is carried out by means of a driving device with pulleys 9 and belts 10 tightly holding the cable "sandwiched".

The driving device is configured so as to prevent the generation of longitudinal vibrations of the cable, which would affect the quality of the marks in the same way as transverse vibrations in a linear marking area.

Other driving systems can be used. The cable can be, for example, rewound on a motor-driven spool, the marking taking place on the freely turning wheel 2, which is driven by the passage of the cable.

In the embodiment illustrated in FIG. 5, which again shows the elements of FIG. 1 with the same reference numerals, the cable 1 is in contact with a belt 11, which itself is in contact with the wheel 25. It is the latter that imposes the curvature of the cable on an arc of a circle and makes it possible to prevent any transverse movement during the laser marking.

The laser beam 3 comes from above and is focused in the plane parallel to the plane of the wheel passing through the surface of the cable. A sweep of the laser beam allows the marking on the fly of any kind of pattern, such as a barcode 12, for example.

Figure 4:
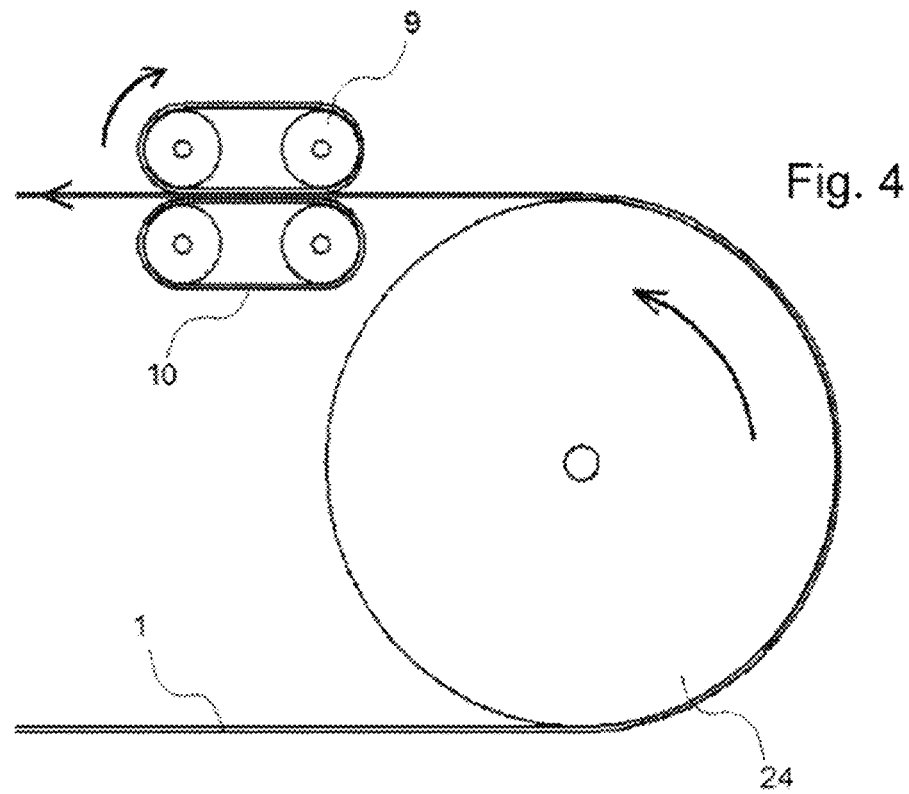
Figure 5:
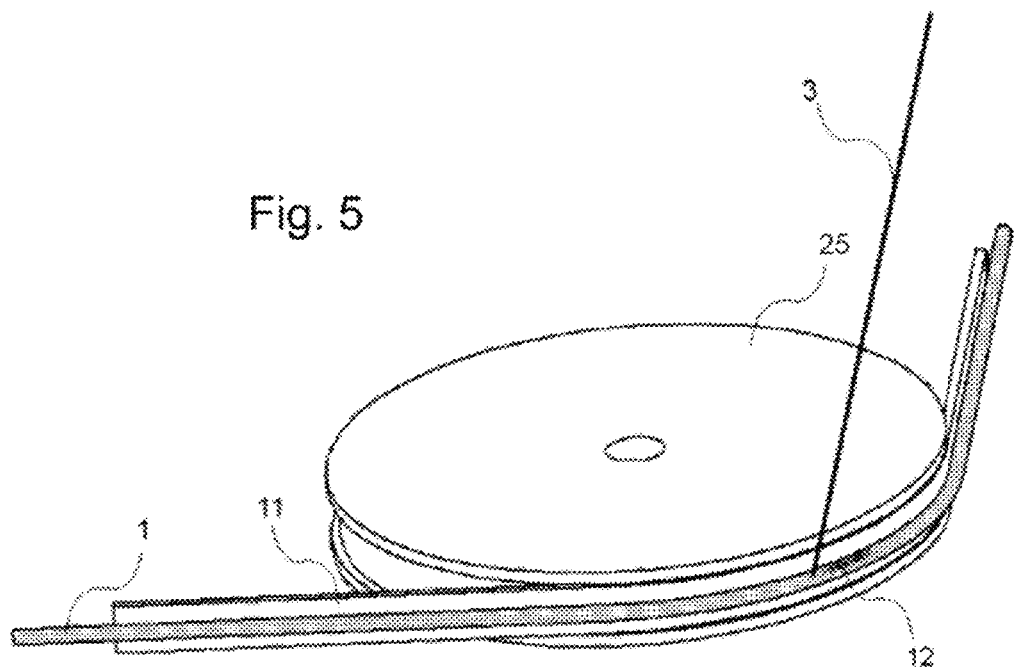

The use of a belt can make it possible to simplify the replacement of wearing parts and/or to couple the guiding on the wheel to a "pulleys-belts" type driving system as represented in FIG. 4.

The wheel can be stationary or it can be motor driven and constitute the driving system for the belt. A system for tightly holding the cable against the belt can then be added.

In the embodiment illustrated by FIG. 6, which again shows the elements of FIG. 1 with the same reference numerals, the cable 1 is marked on the side of an arc of the wheel, but said wheel is stationary this time. In this example, the wheel is truncated and abbreviated to a mechanical part 15 formed by a curved lateral surface on which the cable 1 slides while matching its shape.

Pulleys 13 and 14 participate in the guiding of the cable. They allow the cable to remain applied against the outer surface of the curved part while passing through.

The laser marking is carried out in the same way as described above, that is to say on an arc of a circle along the surface of the cable. Here, the markings 16 are solid circular patterns. They were produced in the marking area corresponding to the central portion of the guiding part. The patterns move with the cable toward the exit of the marking area. The laser beam 3 performs the operations of sweeping and following the cable during its passage. It is located in the end position of the marking area for marking the last pattern constituting the reference mark and, once the reference mark is completed, it is repositioned at the beginning of the marking area in order to start the marking of the next reference mark.

This embodiment presents the advantage of greater compactness, particularly if one wishes to have a marking area of great length (which would require a large wheel diameter).

In the precise case of this embodiment, the curved surface for guiding the cable is not necessarily circular but it can have another type of curvature, for example, elliptic, parabolic or other.

Figure 6:
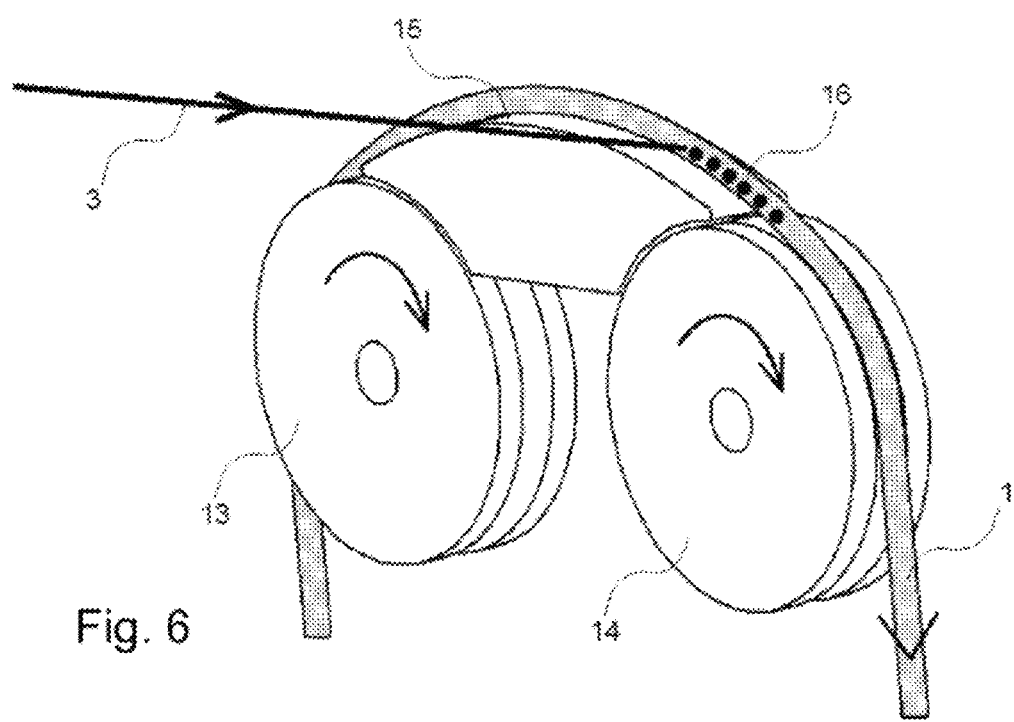
Figure 7:
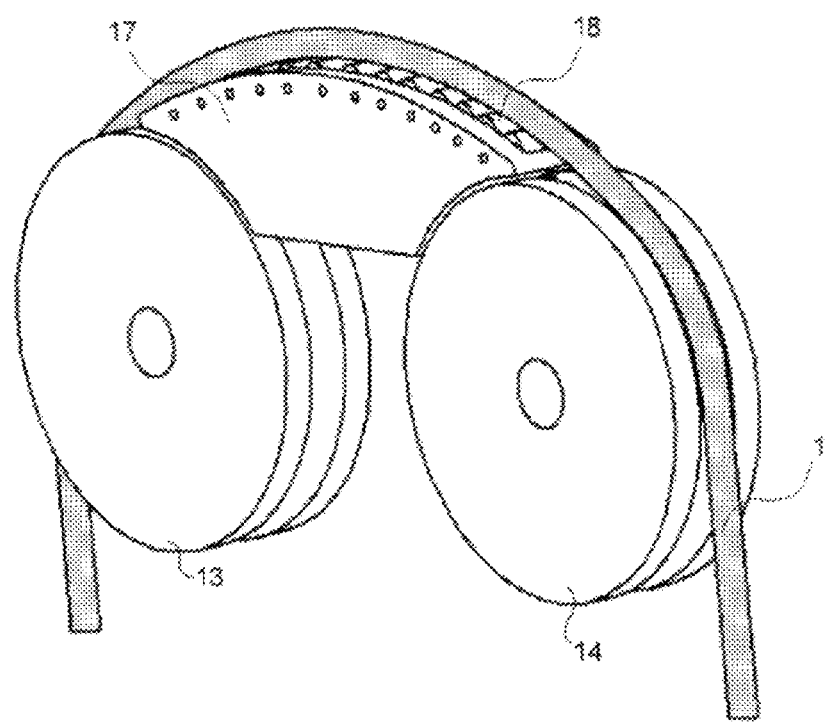

In the embodiment of FIG. 7, which again shows the elements of FIG. 1 with the same reference numerals, instead of sliding on the smooth curved face of the "truncated wheel" 15 of FIG. 6, the cable 1 passes over a guide device 17 comprising a certain number of rolling bearings 18.

The rolling bearings are organized so as to form a casing in contact with the surface of the cable stretched on the device, whose curved shape allows a guiding of the cable without any possibility of interfering transverse movement.

The size and the separation of the rollers can be irregular and optimized so as to perfectly guide cables with irregular surface such as the twisted electrical cables.

The present invention has been described and illustrated in the present detailed description in reference to the attached figures. However, the present invention is not limited to the embodiments presented. Other variants, embodiments and combinations of characteristics can be derived and used by the person skilled in the art after reading the present description and the appended figures.

To satisfy specific needs, a competent person in the field of the invention can apply modifications or adaptations.

In the claims, the term "to comprise" does not exclude other elements or other steps. The indefinite article "a/an" does not exclude the plural. The different characteristics presented and/or claimed can be combined advantageously. Their presence in the description or in different dependent claims in fact does not rule out the possibility of combining them. The reference numerals cannot be understood to limit the scope of the invention.

The invention claimed is:

1. Cable marking system comprising:
   at least one laser device,
   at least one marking area (5) for marking a portion of cable (1) by means of said at least one laser device,
   at least one cable-driving device (2, 9, 10, 11, 13, 14) configured to cause said cable to pass through in said at least one marking area, and
   at least one cable curving device (2, 15, 17) configured to curve said cable in said at least one marking area,
   in which said at least one laser device is configured to emit at least one laser beam which, in the marking plane encompassing the surface of said cable, follows the curved path of the cable imposed by the curving device.

2. System according to claim 1, in which said laser beam is normal to said marking plane.

3. System according to claim 1, comprising moreover at least one cable holding device (7) configured to hold said cable at the site of said at least one cable curving device.

4. System according to claim 1, comprising moreover at least one cable guiding device (6) configured to guide said cable, at least in said marking area.

5. System according to claim 1, in which said at least one driving device comprises an adhering coating in contact with said cable.

6. System according to claim 1, in which said at least one driving device comprises at least one drive belt (9, 10, 11) configured to drive said cable.

7. System according to claim 6, in which said at least one driving device comprises at least one pair of drive belts (9, 10) facing one another and configured to accommodate said cable between them.

8. System according to claim 1, in which said driving device and said cable curving device are integrated in the same device (2).

9. System according to claim 1, in which said at least one curving device comprises at least one wheel portion (15, 17).

10. System according claim 9, in which said at least one wheel portion (15, 17) is configured to allow said cable to slide in said marking area.

11. System according to claim 9, in which said wheel portion (17) comprises a plurality of rolling bearings for causing said cable to roll in said marking area.

12. System according to claim 9, in which said at least one driving device comprises at least one drive belt configured to drive said cable, and said at least one wheel portion (25) is configured to allow said at least one belt to slide in said marking area.

13. System according to claim 12, in which said wheel portion comprises a plurality of rolling bearings for causing said at least one belt to roll in said marking area.

14. System according to claim 9, in which said at least one wheel portion (15, 25) is stationary.

15. System according to claim 1, in which said at least one driving device comprises at least one wheel (2, 23, 24, 25, 13, 14) configured to perform a rotational movement.

16. System according to claim 9, in which said laser device is configured to emit at least one laser beam in a direction perpendicular to the plane of said at least one wheel portion.

17. System according to claim 1, in which said laser device is configured to emit at least one laser beam that moves as a function of the passage of said cable.

18. Cable marking method comprising the following steps:
   driving said cable in order to cause it to pass through in a marking area,
   curving said cable in said marking area, and
   marking at least a portion of said cable in said marking area, by means of at least one laser device emitting at least one laser beam which, in the marking plane encompassing the surface of said cable, follows the curved path of the cable in the marking area.

19. System according to claim 9, in which said at least one driving device comprises at least one pair of drive belts (9, 10) facing one another and configured to accommodate said cable between them, and said at least one wheel portion (25) is configured to allow said at least one belt to slide in said marking area.

* * * * *